(12) United States Patent
Zhang et al.

(10) Patent No.: US 10,231,242 B2
(45) Date of Patent: Mar. 12, 2019

(54) TRAFFIC MANAGEMENT IN THE MOBILE NETWORK

(71) Applicant: Telefonaktiebolaget LM Ericsson (publ), Stockholm (SE)

(72) Inventors: Shunliang Zhang, Beijing (CN); Xuejun Cai, Täby (SE); Zhiping Lei, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/119,909

(22) PCT Filed: Feb. 20, 2014

(86) PCT No.: PCT/CN2014/072305
§ 371 (c)(1),
(2) Date: Aug. 18, 2016

(87) PCT Pub. No.: WO2015/123836
PCT Pub. Date: Aug. 27, 2015

(65) Prior Publication Data
US 2017/0070895 A1 Mar. 9, 2017

(51) Int. Cl.
*H04W 72/04* (2009.01)
*H04W 24/02* (2009.01)
(Continued)

(52) U.S. Cl.
CPC ..... *H04W 72/0486* (2013.01); *H04L 47/2466* (2013.01); *H04L 67/42* (2013.01);
(Continued)

(58) Field of Classification Search
CPC ..... H04L 67/1025; H04L 47/20; H04L 65/60; H04W 72/0486; H04W 72/0493; H04W 72/06; H04W 72/12
See application file for complete search history.

(56) References Cited

U.S. PATENT DOCUMENTS

| 7,317,923 B2 * | 1/2008 | Koshino | H04W 88/08 |
| | | | 370/216 |
| 2012/0176894 A1 * | 7/2012 | Cai | H04L 47/11 |
| | | | 370/230 |

(Continued)

FOREIGN PATENT DOCUMENTS

| CN | 102227934 A | 11/2011 |
| WO | WO 2010/148547 A1 | 12/2010 |

(Continued)

OTHER PUBLICATIONS

International Search Report and Written Opinion of the International Searching Authority, Application No. PCT/CN2014/072305; dated Nov. 28, 2014.

(Continued)

*Primary Examiner* — Raj Jain
(74) *Attorney, Agent, or Firm* — Sage Patent Group

(57) ABSTRACT

A control plane load in a mobile network is managed. The mobile network includes a radio access network having a base station adapted for connecting to a plurality of user equipments (UEs) over a radio interface, and a core network (CN). The RAN determines a RAN control plane load, and transmits an information indicative of the RAN control plane load over a mobility management server to a policy server of the CN to initiate a traffic management in the CN based on the RAN control plane load. Related base stations, mobility management servers, and policy servers are disclosed.

11 Claims, 6 Drawing Sheets

(51) Int. Cl.
*H04W 28/02* (2009.01)
*H04L 12/855* (2013.01)
*H04L 29/06* (2006.01)
*H04W 88/02* (2009.01)

(52) U.S. Cl.
CPC ........... *H04W 24/02* (2013.01); *H04W 28/02* (2013.01); *H04W 72/0493* (2013.01); *H04W 88/02* (2013.01)

(56) References Cited

U.S. PATENT DOCUMENTS

| | | | | |
|---|---|---|---|---|
| 2013/0273974 A1* | 10/2013 | Lea | ........................ | H01Q 21/24 455/562.1 |
| 2013/0301415 A1* | 11/2013 | Archer | ................. | H04W 28/08 370/235 |
| 2014/0372591 A1* | 12/2014 | Payette | ................. | H04L 67/141 709/223 |
| 2015/0223252 A1* | 8/2015 | Yan | ........................ | H04W 24/08 455/452.1 |
| 2017/0070895 A1* | 3/2017 | Zhang | ................... | H04W 24/02 |

FOREIGN PATENT DOCUMENTS

| | | |
|---|---|---|
| WO | WO 2011/144121 A1 | 7/2013 |
| WO | WO 2013/100828 A1 | 7/2013 |

OTHER PUBLICATIONS

3GPP, Technical Report—"3rd Generation Partnership Project, Technical Pecification Group Services and System Aspects; System Enhancements for User Plane Congestion Management (Release 12)", 3GPP TR 23.705 V0.8.0 (Oct. 2013), 51 pp.

3GPP; Technical Report—"3rd Generation Partnership Project, Technical Specification Group Services and System Aspects; Machine-Type and other mobile data applications Communications enhancements (Release 12)", 3GPP TR 23.837 V1.2.0(Aug. 2013), 153 pp.

* cited by examiner

TRAFFIC MANAGEMENT IN THE MOBILE NETWORK

CROSS REFERENCE TO RELATED APPLICATION

This application is a 35 U.S.C. § 371 national stage application of PCT International Application No. PCT/CN2014/072305, filed on Feb. 20, 2014, the disclosure and content of which is incorporated by reference herein in its entirety. The above-referenced PCT International Application was published in the English language as International Publication No. WO 2015/123836 A1 on Aug. 27, 2015.

TECHNICAL FIELD

The present invention generally relates to traffic management, and more specifically relates to managing traffic based on the load with respect to the control plane within a mobile communications network.

BACKGROUND

The way of communicating in mobile communications networks is subject to a significant change due to a development of the network infrastructure and the mobile terminals on the one hand and to the development of application software on the other hand.

Due to the rapid growth of smart phone penetration, data traffic over mobile networks is experiencing a significant growth. In the meantime, a huge number of smartphone applications have been developed, and especially applications associated to social networking have become very popular. Many smartphone applications have quite different traffic patterns compared to traditional voice services or data services. For example, with various social networking applications, people are instantaneously sharing information anytime and anyplace. Such applications often show rather low data utilization compared to control resource utilization, e.g. showing a large number of small packets with frequent radio resource control (RRC) state changes.

Existing mobile networks designed based on traditional traffic models are facing serious challenges, as the traffic pattern resulting from above-mentioned applications may lead to an inefficient use of networks resources.

According to ongoing discussion within 3GPP, smartphone application traffic can be classified as normal data traffic and small data traffic; small data traffic may be further classified as frequent small data traffic and infrequent small data traffic. For small data traffic, a problem to be tackled is called signaling storm, e.g. traffic consisting of a large number of signaling messages to convey small volume of data traffic.

To resolve problems resulted from certain smartphone traffic, many solutions from core network and radio access network aspect have been raised and discussed within 3GPP proposing an enhancement of UE, radio access network devices, and/or core network devices. UE dependent solutions however may need several years until a significant penetration is achieved. In the meantime, enhanced smartphone may coexist with non-enhanced smartphones.

SUMMARY

It is an object of the present invention to provide a data management solution without a need to enhance current user equipment.

This object is achieved by the independent claims. Advantageous embodiments are described in the dependent claims and by the following description.

The mobile communications network can be regarded as to comprise a radio access network, RAN, to provide a radio connection between mobile terminal and the mobile network, and a core network, CN, to perform various functions like authentication, authorization, accounting, and policy enforcement. Further, the core network comprises gateway nodes to interface to packet networks, e.g. being based on the internet protocol, IP.

According to an embodiment, the RAN reports load information related to the RAN control plane to the core network. This load information is being evaluated in the core network that determines a policy to be enforced in the mobile network. This load information in the following is also being referred to as MN (control plane) load (information) or MN (control plane) load status (information).

The RAN control plane load may comprise the following load contributions:
- radio interface control plane load (different radio layers may be considered),
- control plane load with respect to the interface between the RAN and the CN, (e.g. load with respect to the interface between a RAN network element handling traffic to the mobile terminal(s), e.g. an eNB according to 3GPP LTE standards) and a control node of the core network exchanging control messages with respect to a mobility management of the UEs, e.g. a mobility management entity, MME),
- control plane load related to involved RAN network element (eNB), In an embodiment, UE specific contribution to control plan load may be identified and determined. This contribution may comprise:
- UE specific contributions to the radio control plane load, and
- UE specific contribution to RAN-CN control plane interface (e.g. S1-MME) load.

In an embodiment the RAN (e.g. eNB) calculates and the radio interface control plane load, the control plane load related to the involved RAN network element (the eNB), UE specific contributions to the radio control plane load, and generates a load report indicative of each a status of these load contributions to be sent to the core network.

In the core network, a suitable core network node (e.g. the MME) may determine the interface control plane load between the RAN and the CN (S1-MME), the control plane load related to core network node (MME) and UE specific contribution to RAN-CN interface (S1-MME) load.

The core network node (MME) may generate a consolidated report comprising the report received from the RAN node (eNB) and the load contributions determined by node itself (MME) to be conveyed to a policy server of the CN.

In an embodiment, in response to receiving the control plane load status comprising information indicative of a certain load problem, the policy server identifies one or a plurality of UEs contributing to or causing control plane load problems.

The policy server may identify problematic UE (UEs significantly contribution to MN control plane load) and corresponding application traffic to define an appropriate policy to manage or control the application traffic to avoid or reduce control plane overload situations.

In an embodiment, the policy server may contact a corresponding application server to initiate a traffic optimization on the application layer.

The present invention also concerns computer programs comprising portions of software codes in order to implement the methods as described above when operated by a respective processing unit of appropriate nodes, e.g. a radio base station of a radio access network, a mobility server and a policy node in a core network. The computer programs can be stored on a computer readable medium. The computer-readable medium can be a permanent or rewritable memory within the user device or the recipient device or located externally. The respective computer program can be also transferred to the node for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
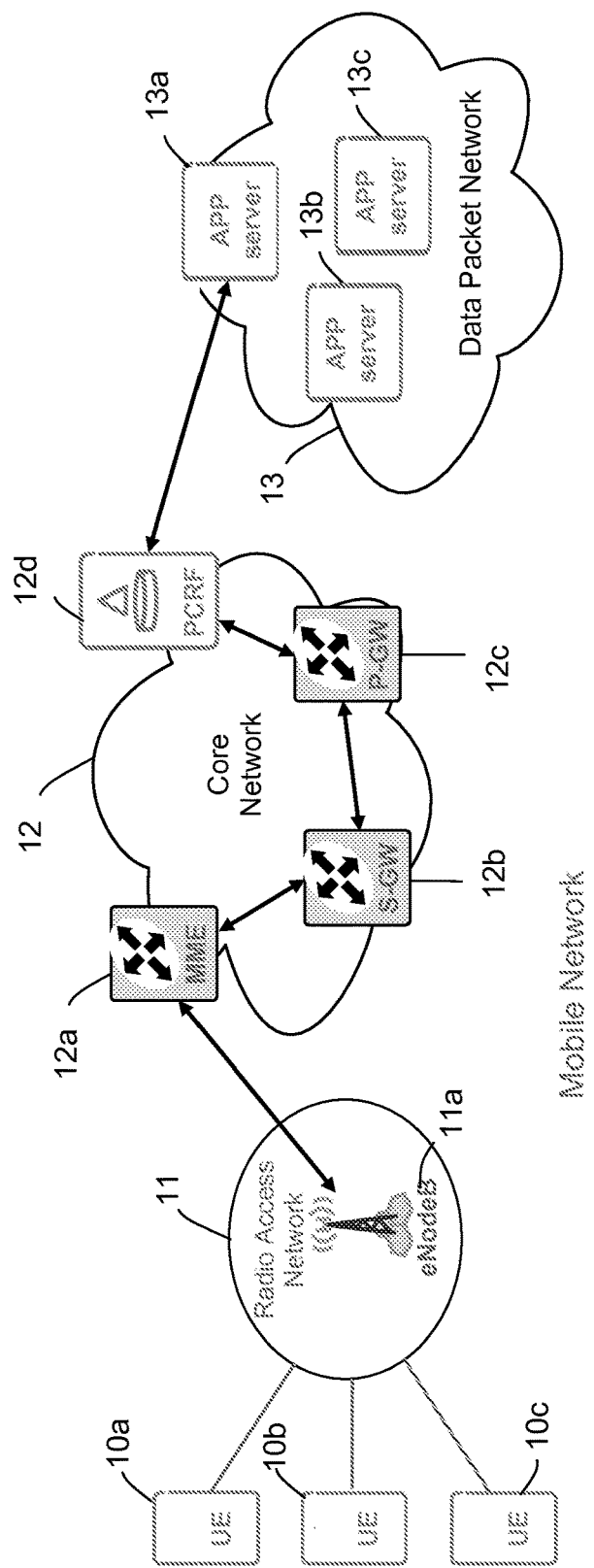
FIG. 1 shows a block diagram illustrating an exemplary communications network for performing control load policy enforcement by the core network based on control load information of the radio access network.

FIG. 1 shows a principle block diagram of a communications network with a communications network and a plurality of mobile terminals or user equipments UEs $10a$, $10b$ and $10c$, to perform a traffic management according to embodiments of the invention. The communications network 1 by way of example shows a radio access network, RAN 11, a core network, CN 12 and a data packet network 13.

The radio access network, RAN, 11 by way of example may comprise different access technologies like GSM, UMTS Terrestrial Radio Access Network, UTRAN, and evolved UMTS Terrestrial Radio Access Network, eUTRAN, according to 3GPP standards. Exemplarily, the RAN 11 of FIG. 1 shows a so-called evolved Node B, eNB, $11a$ according to 3GPP LTE standards. The eNB $11a$ may interface to further eNBs by means of the so-called X2 interface using X2 application protocol, X2-AP. The eNB $11a$ couples to the UEs $10a$, $10b$, $10c$ by means of the LTE air interface that also being referred to as Uu interface.

Further exemplarily, the core network 12 is a so-called Evolved Packet Core, EPC, network according to 3GPP LTE specifications. FIG. 1 exemplarily depicts a mobility management entity, MME $12a$, serving gateway, S-GW $12b$, and a Packet Data Network Gateway, P-GW $12c$, and a policy server, PCRF $12b$ as nodes of the core network 12.

The MME $12a$ for managing the mobility of the UEs allowing to access network services anywhere, as well as to continue their ongoing communication and to access network services anywhere. It is further involved in the bearer activation/deactivation process and is also e.g. responsible for choosing the S-GW for the UE.

The eNB couples to MME by the S1-MME reference point using the S1 Application Protocol, S1-AP, for control plane traffic.

The eNB couples to S-GW by the S1-U reference point using the GPRS Tunneling Protocol User Plane, GTP-U, for control plane traffic.

Collectively the S1-MME and S1-U interfaces are also being referred to as S1 interface, which represents the interface from eNB to the EPC.

The S-GW $12b$ terminates the mobile network towards the RAN 11. Amongst other functions, this gateway serves as a local mobility anchor (e.g. with respect to eUTRAN eNB handover).

The P-GW $12c$ terminates the mobile network by means of the so-called SGi interface towards the mobile network external networks, e.g. a data packet network 13 being discussed later-on. The P-GW $12c$ may comprise (or collocated to) a so-called Policy and Charging Enforcement Function, PCEF, to enforce a policy received from the policy server/PCRF $12d$.

The policy server $12d$ enables operators to dynamically control network resources with real-time policies based on service, subscriber or usage context. The policy server may be adapted to access suitable data bases, e.g. subscriber databases, and specialized functions, such as subscriber charging functions. The policy server $12d$ may comprise a so-called Policy and Charging Rules Function, PCRF, according to 3GPP, or may be associated with a PCRF server. In the following, without an intention to limit the disclosure, the policy server $12d$ is also being referred to as PCRF (server) $12d$. According to embodiments of the invention, the policy server $12d$ is enhanced to evaluate RAN related control plane traffic load and to initiate actions to cope with certain load situations.

The data packet network 13 is shown as exemplarily comprising application servers (APP servers) $13a$, $13b$, $13c$, also being referred to as Application Functions according to 3GPP.

The RAN 11, e.g. by means of a function implemented in the eNB $11a$, may determine a RAN control plane load status, and to report such status to the CN. By way of example, a load status information indicative of a traffic load status (and thus of a traffic load problem) with respect to the eNB control plane is sent from the eNB (over the S-GW $12b$) to the MME $12a$.

The CN 12 e.g. by means of a function implemented in the MME $12a$, may determine further load status (e.g. control plane traffic load at the interface or reference point (S1-MME) between the eNB $11a$ and the MME $12a$, and control plane load related to MME). It may send a consolidated load report based on the load report received from the eNB and the further load status to the policy node $12d$. The policy server $12d$ may decide to take an action to reduce the control plane load in the mobile network and generate a corresponding policy response message. This message may be conveyed back the P-GW/PCEF $12c$ to perform or enforce actions according to the policy message.

In a variant, a control plane load contribution of one or a plurality of certain UEs is determined, e.g. control plane load contribution of such UE(s) that significantly contribute to the control plane load (e.g. UEs with contributions exceeding a certain control load threshold or a certain number of the most busy UEs). The RAN 11 may report such UE(s) and the associated load information to the CN.

In an embodiment, the policy node 12d requests subscriber information of the identified UE(s) (e.g. from a subscriber data base controlled by an HSS or HLR or SPR) to decide whether to initiate actions to reduce the control load associated to such UE(s), and send a corresponding policy message back to the P-GW to enforce the policy.

In an embodiment the policy server 12d identifies traffic associated to a certain APP server 13a, 13b, 13c, in the following also being referred to as APP traffic, e.g. based on identifying a (problematic) signaling traffic load resulting from a UE involved in a certain (smartphone) application associated to the APP server. Thereto an overhead ratio between the signaling load and the corresponding user plane traffic may be determined and compared with a certain overhead ration threshold (as example, if for a certain application, the resulted signaling traffic volume during certain time is 2 megabit during certain time period, and the actual data traffic volume is 1 megabit during the same period, the overhead ratio is 2). Further destination/source IP addresses of the corresponding problematic APP traffic may be used to identify the corresponding APP server.

In addition, the policy server 12d provides load information and related UE identities to the corresponding APP server(s) requesting a traffic optimization with respect to the served UE(s) in order to avoid or reduce the control traffic load and thus to disburden the mobile network (i.e. to ask the APP server to act more mobile network friendly).

In the following, by way of example, it will be assumed that RAN node serving the UEs 10a, 10b 10c is an eNB according to 3GPP LTE specifications. The CN node handling the mobility of the UE is an MME the exemplary control plane load contributions and the determination of such contributions will be described in more detail.

The RAN control plane traffic load can be derived from different instances, e.g. from the radio interface physical, PHY, layer and/or from the MAC layer and/or from RRC layer, and/or from the S1-MME interface separately or in combination:

radio interface PHY layer: the control plane load may be derived from the PRB (Physical Resource Block) consumed by upload, UL, and/or download, DL, control channel signaling (Physical Uplink Control Channel, PUCCH, Physical Random Access Channel, PRACH, and Physical Downlink Control Channel, PDCCH).

radio interface upper layer: the control plane load may be derived from the total size (in Byte) of, PDCP (Packet Data Convergence Protocol) PDU (Protocol Data Unit) or MAC (Media Access Control) PDU conveying RRC (Radio Resource Control) signaling traffic, or RRC signaling traffic.

S1-MME interface: the control plane load may be regarded as the total size of S1AP messages exchanged between eNB and MME. the UE-related S1AP traffic load and non-UE-related S1AP traffic load may be calculated separately.

The actual load information may be coded in a format (e.g. a normalized format) to be interpreted by the CN and/or the APP server.

With respect to the eNB, (Uu interface), one or a plurality of the following load aspects may be taken into account:
a hardware load of the eNB,
a software load of the eNB,
a total number of ongoing RRC sessions,
a number of RRC transactions per time unit (e.g. per second),
a number of supported concurrent RRC sessions, and
a number of radio resource control, RRC, transactions by the eNB (e.g. per second).

With respect to the MME (S1 interface), one or a plurality of the following load aspects may be taken into account:
a hardware load of the MME,
a software load of the MME,
a total number of ongoing S1 sessions,
a number of S1 transactions per time unit (e.g. per second),
a number of supported concurrent S1 sessions, and
a number of S1 transactions supported by the MME (e.g. per second).

The eNB 11a may determine the Uu control plane load, its own load, UE specific contributions to the control plane load for all or certain UEs served by the eNB (together with corresponding UE identifications, IDs), determine a corresponding RAN control load status, and transmit the RAN control load status to the MME 12a. The status information may be reported by means of a S1AP message extended to convey additional information.

The MME 12a may determine the S1-MME control plane load, its own load, determine a corresponding MME control load status, UE specific contributions to the S1-MME control plane load for all or certain UEs served by the MME (together with corresponding UE identifications, IDs), generate a combined mobile network, MN, control load status based on the RAN control load status and the MME control load status, and transmit the MN control load status, and UE specific contributions to control plane load, to the S-GW 12b e.g. by means of a GTP-C message extended to convey additional information.

The S-GW 12a forwards the MN control load status the P-GW 12c, which forwards this status information to the policy server 12d, e.g. as Diameter message extended to convey additional information.

In an embodiment, in response to receiving the MN control load report, the policy server 12d generates a policy to manage smartphone APP data traffic related to certain identified UEs, in the following also being referred to as UE related control plane load contribution.

In a case wherein the MN control plane is overloaded or tends to be overloaded, overload reduction actions may be performed depending on UE related control plane load contribution and control load characteristics of traffic associated to certain identified applications.

If the UE related control plane load contribution is small, the traffic from the corresponding UE(s) may not be controlled or blocked.

If the UE related control plane load contribution is big (a comparison value of the control plane load exceeding a certain threshold), the policy server may identify application traffic with respect to a certain application, APP, performed between UE and application server and a corresponding control plane overhead ratio of the APP.

If the overhead ration exceeds a certain threshold, the corresponding APP traffic may be controlled or blocked. Thus traffic associated to an APP with higher control plane overhead ratio may be controlled or blocked earlier and/or more radical than traffic associated to APPs with lower control plane overhead ratio.

If the control plane overload situation has disappeared, the APP specific traffic management policy may be updated accordingly, e.g. the previously controlled or blocked APP traffic with high control plane overhead ratio gets uncontrolled or unblocked.

The control plane overhead ratio of an APP may be derived from following aspects when the APP is the only one running on the UE:

S1 interface: the control plane overhead may be determined as the ratio of UE related total S1AP traffic size to the S1-U GTP-U traffic size.

X2 interface (inter eNB communication within the RAN): the control plane overhead may be determined as the ratio of total UE related X2 Application Protocol (X2AP) traffic size to total X2 GTP-U (GPRS Tunneling Protocol User Plane) traffic size.

Uu interface physical layer: the control plane overhead may be determined as the ratio of the PRB consumed by DL and UL control channel PDCCH, PUCCH, PRACH to the PRB consumed by DL and UL data channel PDSCH and PUSCH.

Uu interface upper layer: the control plane overhead may be determined as the ratio of related total size of PDCP PDU or MAC PDU conveying RRC signaling traffic to total size of PDCP PDU or MAC PDU conveying user data traffic.

The overhead ratios from different contributions may be determined separately or in combination.

In an embodiment, the policy server 12d further involves the application server domain for traffic optimization. Therein, if the policy server determines that a UE is involved in an APP with a high control plane overhead ratio and control plane overload problem is detected, the PCRF provides RAN control plane load status info and related UE ID/IP in question to the AF (APP server) for the APP traffic optimization. The Uu and S1 control plane load status may be provided separately for APP to initiate more efficient APP traffic optimization mechanism; related UE ID/IP address is provided so that the APP server could find the right APP client to initiate traffic optimization.

If the control plane load status changes, e.g. changes between any of the status categories overload, normal load, light load, the PCRF 12d may update the AF with updated mobile network control plane load status information, and related UE ID info to allow an adjustment of an APP traffic pattern adaptively.

Upon receiving the mobile network control plane load status and related UE ID/IP, the APP may initiate APP specific mechanism with related APP clients:

If the control plane load status is indicated as overloaded, the APP server may initiate the process with the APP client to reduce the traffic exchange frequency (e.g. Keep alive message frequency, news update frequency), and/or bundle more traffic into a burst to alleviate/reduce the control plane load.

If the control plane load is indicated as light, e.g. to improve a quality of user experience, the APP server may initiate the process with the APP client to increase the traffic exchange frequency.

Figure 2:
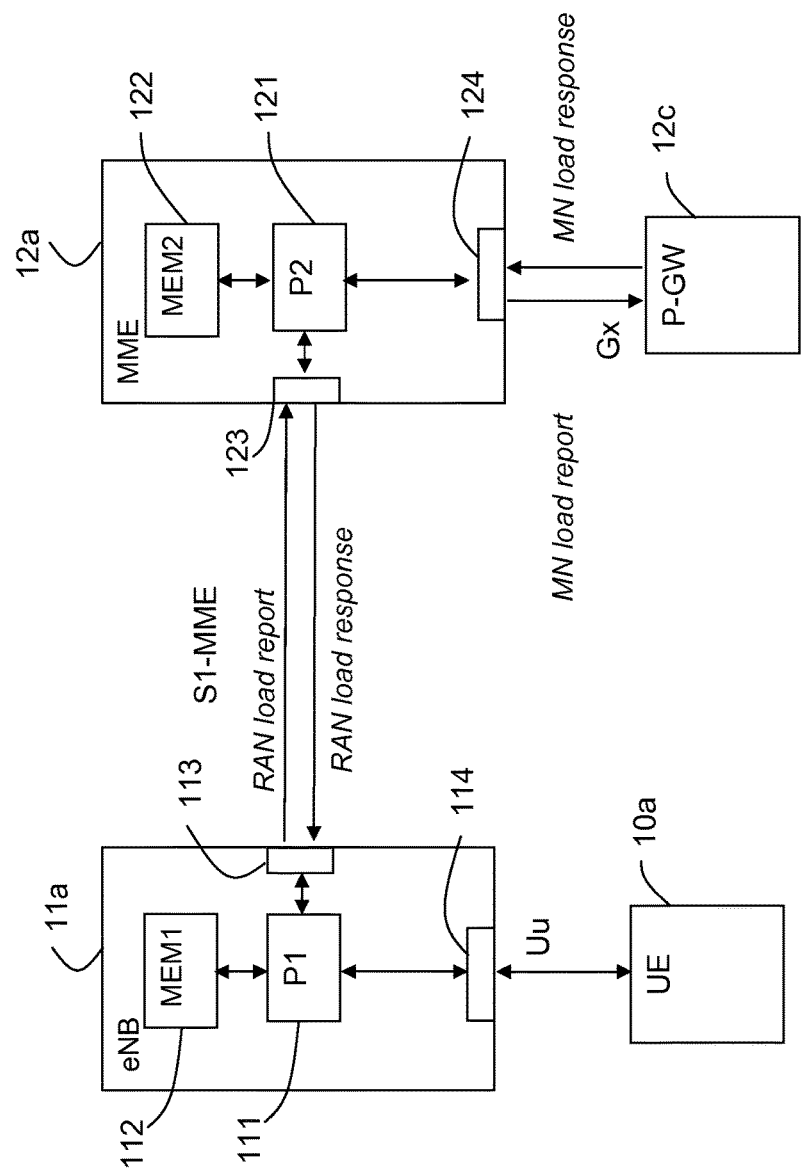
FIG. 2 shows a block diagram of a radio base station and a mobility management entity of the communications network of FIG. 1.

FIG. 2 shows a block diagram of an eNB 11a and a MME 12a of the communications network of FIG. 1.

The eNB 11a exemplarily comprises a first processor P1, a first memory MEM1, a first interface 113 and a second interface 114. The first processor P1 is coupled to the first and second interfaces 113 and 114, and to the first memory MEM1.

The MME 12a exemplarily comprises a second processor P2, a second memory MEM2, a third interface 133 and a fourth interface 124. The second processor P2 is coupled to the third and fourth interfaces 123 and 124, and to the second memory MEM2.

The first interface 113 is coupled to the third interface 123 by means of a so-called S1-MME interface according to 3GPP LTE standards. This point is used to send the eNB control plane load information from the eNB to the MME, and to send a RAN load response from the MME to the eNB as discussed under FIG. 1. The second interface is coupled to an exemplary UE 10a over the eUTRAN air interface Uu. The fourth interface is coupled to a P-GW by means of the Gx interface to send the MN load report and to receive the MN load response as discussed under FIG. 1.

The first memory and second MEM1, MEM2 may each include a read-only memory (ROM), e.g., a flash ROM, a RAM, e.g., a dynamic RAM (DRAM) or static RAM (SRAM), a mass storage, e.g., a hard disk or solid state disk, or the like.

The first memory MEM1 includes suitably configured program code to be executed by the first processor P1 so as to implement method steps as explained in the following FIG. 3. The second memory MEM2 includes suitably configured program code to be executed by the second processor P2 so as to implement method steps as explained in the following FIG. 4.

Figures 3, 4:
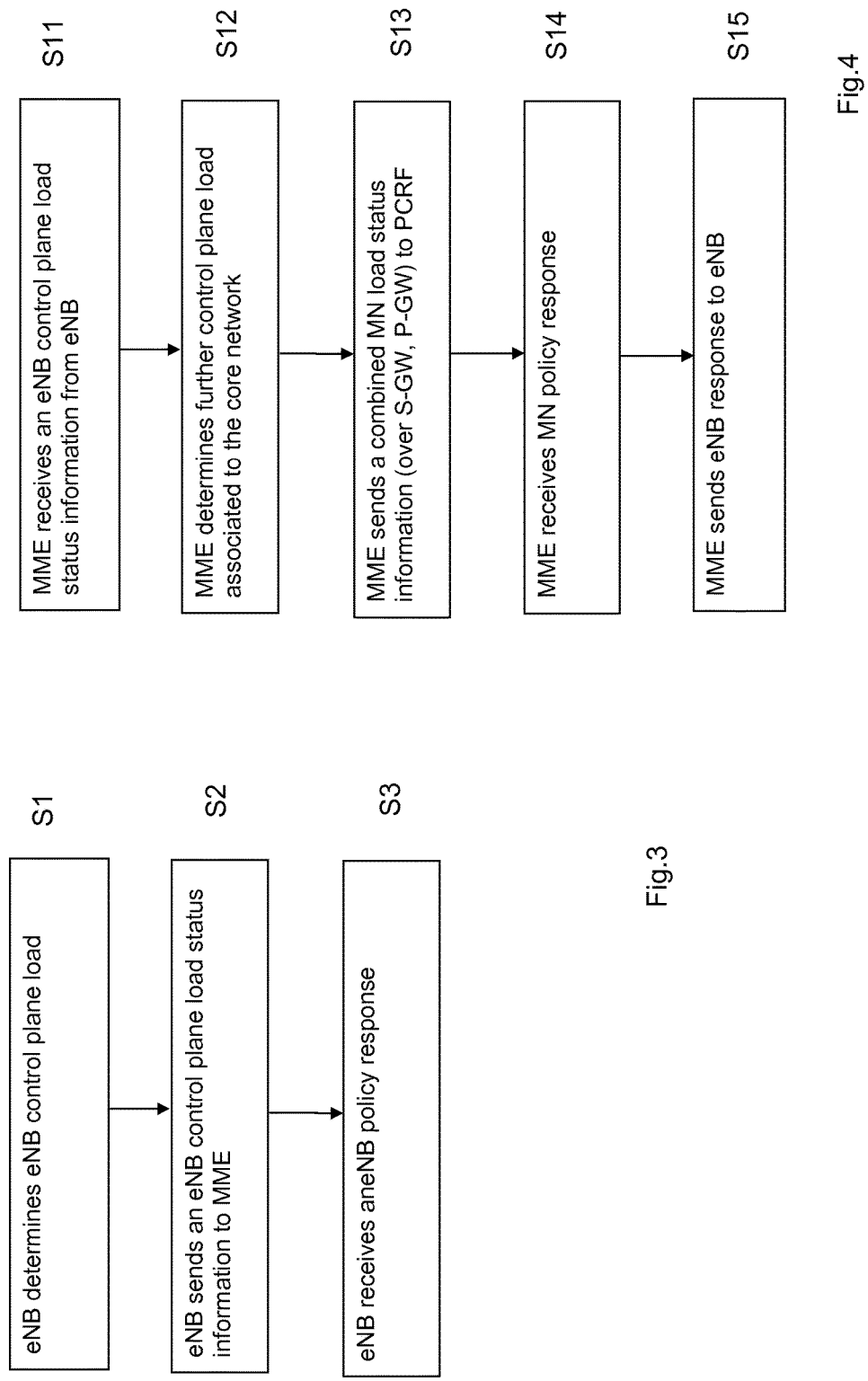
FIG. 3 shows a first exemplary sequence of steps performed by the radio base station according to FIG. 2.
FIG. 4 shows a second exemplary sequence of steps performed by the mobility management entity according to FIG. 2.

FIG. 3 shows a first exemplary sequence of steps performed by the eNB 11a according to the preceding description.

In a first step S1 (of this embodiment) the eNB 11a determines (measures/calculates) control plane load with respect to the eNB as discussed above.

In a second step S2 (of this embodiment) the eNB 11a sends a corresponding RAN (control plane) load report to the MME 12a.

In a third step S3 (of this embodiment) the eNB 11a receives a corresponding RAN (control plane) load response from the MME 12a.

FIG. 4 shows a second exemplary sequence of steps performed by the MME 12a according to the preceding description.

In a first step S11 (of this embodiment) the MME 12a receives the RAN (control plane) load report from the MME 12a.

In a second step S12 (of this embodiment) the MME 12a determines further control plane load associated to the MME.

In a third step S13 (of this embodiment) the MME 12a sends a combined load status information, also being referred to as mobile network, MN, (control plane) load report based on the RAN load report and the further control plane load to the S-GW 12b.

In a fourth step S14 (of this embodiment) the MME 12a receives a corresponding MN (control plane) load response.

In a fifth step S5 (of this embodiment) the MME 12a sends a corresponding RAN (control plane) load response to the eNB 11a.

Figure 5:
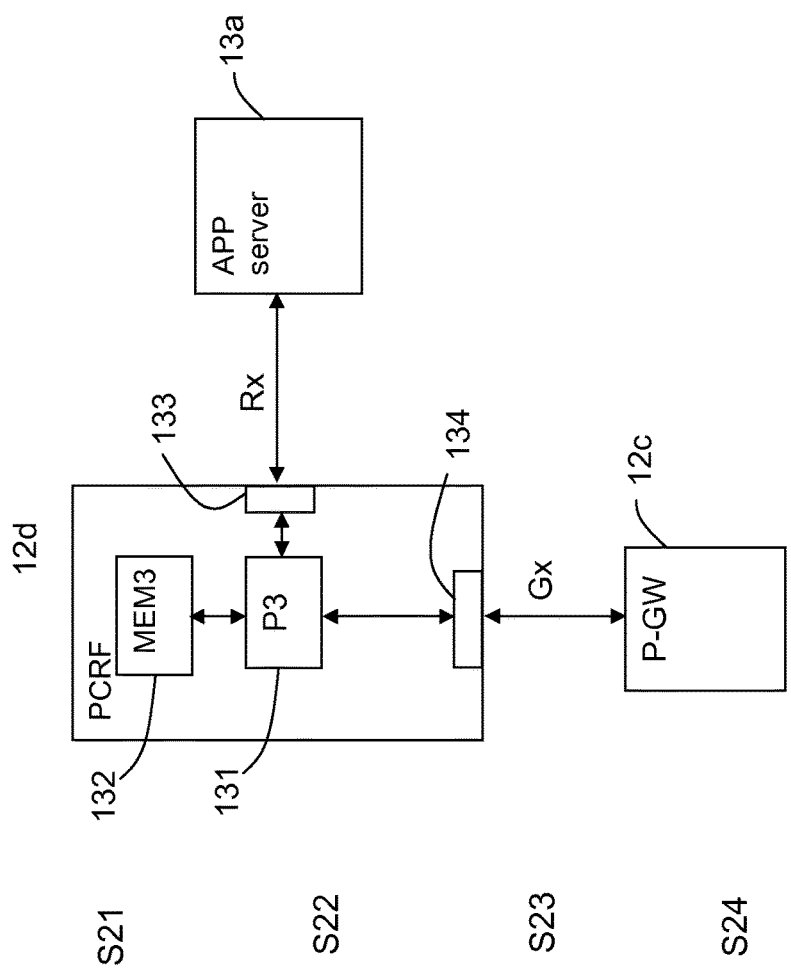
FIG. 5 shows a block diagram of a policy server of the communications network of FIG. 1.

FIG. 5 shows a block diagram of a policy server or PCRF 12d of the communications network of FIG. 1.

The PCRF 12d exemplarily comprises a third processor P3, a third memory MEM3, a fifth interface 133 and a sixth interface 134. The third processor P3 is coupled to the fifth and sixth interfaces 133 and 134, and to the third memory MEM3.

The fifth interface 133 is coupled to an exemplary APP server 13a of FIG. 1 by means of a so-called RX interface according to 3GPP LTE standards. The sixth interface is coupled to the P-GW 12c of FIG. 1 by means of the Gx interface.

The third memory MM3 may include a read-only memory (ROM), e.g., a flash ROM, a RAM, e.g., a dynamic RAM (DRAM) or static RAM (SRAM), a mass storage, e.g., a hard disk or solid state disk, or the like.

The third memory MEM3 includes suitably configured program code to be executed by the third processor P3 so as to implement method steps as explained in the following FIG. 6.

Figure 6:
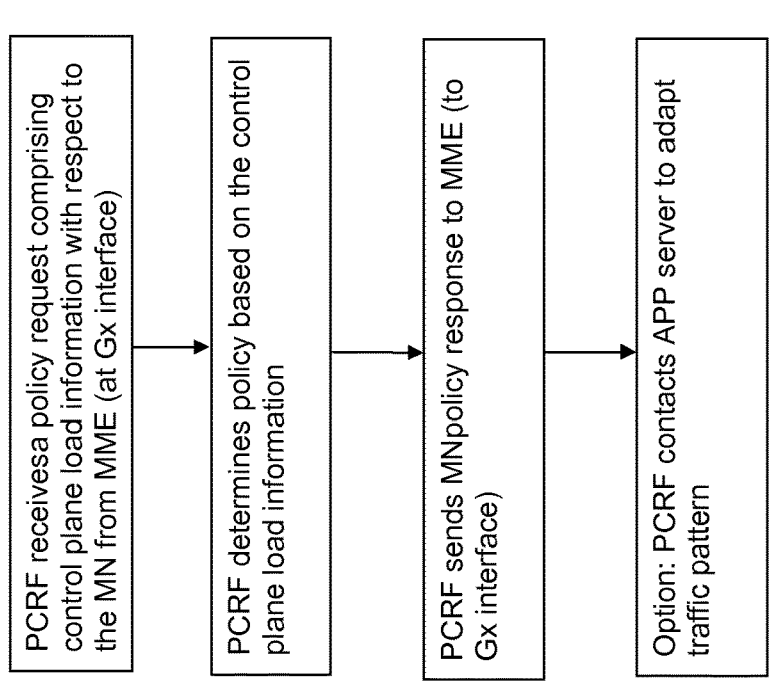
FIG. 6 shows a third exemplary sequence of steps performed by the policy server according to FIG. 2.

FIG. 6 shows a third exemplary sequence of steps performed by the PCRF 12d according to the preceding description.

In a first step S21 (of this embodiment) the PCRF 12d receives a policy request based on the MN load report from the P-GW 12c.

In a second step S22 (of this embodiment) the PCRF 12d determines a policy to be enforced by the MN in response to the policy request.

In a third step S23 (of this embodiment) the PCRF 12d sends a policy response to the P-GW 12c, that may be regarded as an indirect indication that load information has been correctly received.

In a fourth step S14 (of this embodiment) the PCRF 12d identifies an APP server 13a to be contacted for providing mobile network control plane load status info and/or UE ID/IP, to enable the APP server to optimize its traffic with the corresponding UEs.

Figure 7:
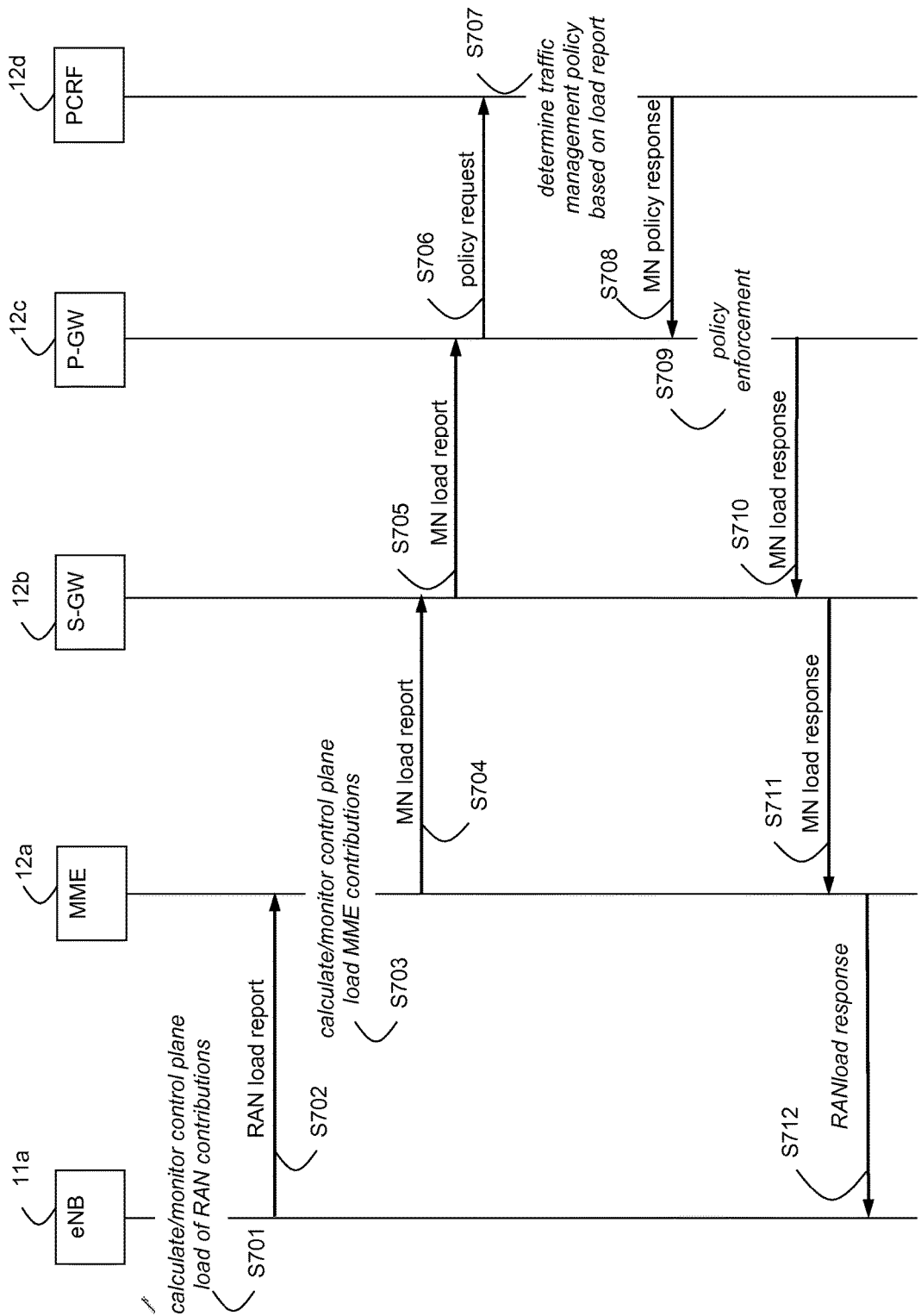
FIG. 7 shows a fourth exemplary sequence of steps illustrating a control load policy enforcement on the access network by the core network.

In the following FIG. 7, an exemplary sequence of steps being performed by above-described network elements is illustrated:

In a first step of (this embodiment) S701, the eNB 11a determines a Uu control plane load, its own load, UE specific contributions to the control plane load for all or certain UEs served by the eNB 11a (together with corresponding UE identifications, IDs), determine a corresponding RAN control load status.

In a second step of (this embodiment) S702, the eNB 11a transmits the RAN control load status to the MME 12a. The status information may be reported by means of a S1AP message extended to convey additional information.

The eNB 11a may indicate the load status by means of normalized values (as values x and y, meaning that x % of available resources are used and y % are still available) in a format that can be understood by the appropriate core network nodes and/or involved application servers 13a, e.g. so-called over-the-top, OTT, application servers.

The load report may comprise a consolidated load information indicative of consolidated control load of different load contributions, e.g. Uu (interface) control plane load, S1-MME control plane load, eNB control plane load, UE specific contribution to eNB control plane load and UE specific contributions to S1-MME load. Alternatively or additionally, the load report may comprise load information with respect to one or a plurality of each load contribution.

In an embodiment, different load categories may be defined, e.g. light load, normal load, and overload to indicate a consolidated load status or load status of the different load contributors The NB may send a load report (only) in case of a control plane load category change (of the consolidated reload and/or of any load contribution), e.g. changes from normal load to overload or vice versa).

For example, according to above-described embodiments, the PHY control plane load may be indicated in terms of load categories like overload, normal load or light load, or it may be indicated as x % of PDCCH resource has been used, or y % PRB resource allocated for PHY control resource has been used, with x, y being values between 0 and 100.

In a variant, instead of sending UE specific load information with respect to all served UEs 10a, 10b and 10c, only contributions with respect top contributing UEs may be reported (together with corresponding UE IDs).

In third step of (this embodiment) S703, the MME 12a may measure signaling traffic load status with respect to the S1-MME interface and its MME control plane load (software and/or hardware load status). Additionally, the MME may determine UE contributions related S1-MME signaling traffic overhead, e.g. control plane load contributions from the UEs.

In a fourth step of (this embodiment) S704 the MME 12a sends a mobile network, MN (control plane) load report to the S-GW 12b. As discussed afore, the load report may comprise Uu control plane load status information, S1-MME signaling load status information, its own hardware and software load status, and/or UE specific contributions (of UEs served by the MME) and associated UE ID to the S-GW. The additional info may be conveyed by extending an appropriate GTP-C message or by a new GTP-C message from the MME to the S-GW.

The MN load report may be sent in response to any load status change, e.g. with respect to the Uu control plane load, the S1-MME related load, and/or a load control status change of its own hardware or software.

In a fifth step 705 (of this embodiment), the S-GW 12b forwards the load information to the P-GW 12c.

In a sixth step 706 (of this embodiment), the P-GW 12c sends a policy request to the PCRF 12d with the load information received from the S-GW, e.g. by generating an appropriate diameter message over the Gx interface.

In an embodiment, P-GW 12c sends the request in response to receiving a MN control plane load status update information.

In a seventh step 707 (of this embodiment), based on the received control plane status, (MN control plane load status info, contribution from specific UEs, and detected APP traffic related to specific UEs) the PCRF 12d determines if a traffic management or control action may be taken, e.g. by generating a policy message. In a case that received control plane load status changes, the PCRF 12d may identify specific APP traffic based on a control plane overhead ratio of the APP. In addition, the PCRF 12d may identify one or a plurality of UEs as targets for traffic management based on the received UE specific control plane load contributions, as well UE subscription information (e.g. retrieved from a subscriber data base). The PCRF 12d may generate a new (or updated) policy to manage the specific APP traffic from/to a specific UE.

In an embodiment, a threshold for the control plane overhead ratio of a typical APP may be preconfigured and stored at the PCRF 12d.

In an eight step 708 (of this embodiment), the PCRF 12d provides new policy information to the Policy and Charging Enforcement Function, PCEF, (collocated with the P-GW 12d in this example) by providing a mobile network, MN, policy response.

In the following exemplary traffic management policy rules are described:

(a) In case the RAN control plane is overloaded or getting overloaded, but the UE related control plane load contribution is small, the APP traffic from the UE may not be controlled or blocked.

(b) In case the RAN control plane is overloaded or getting overloaded, and the UE related control plane load (radio) exceeds a certain threshold, the PCRF identifies the corresponding APP traffic to be controlled, e.g. based on a control plane overhead ratio of the APP. The traffic APP with higher control plane overhead may be controlled or blocked earlier or more intensively than that of APP with lower control plane overhead ratio.

(c) Vice versa, in case control plane overload disappeared, the APP specific traffic management policy may be updated accordingly, e.g. the previously controlled or blocked APP traffic with high control plane overhead ratio is unblocked, released from control and/or permitted.

In a ninth step 709 (of this embodiment), The PCEF receives the MN policy response from the PCRF 12*d* to enforces the corresponding policy.

In a tenth step 710 (of this embodiment), The P-GW 12*c* sends to the S-GW 12*b* a load response to be forwarded to the MME e.g. with a GTP-C message.

In an eleventh step 711, the S-GW forwards the load response to the MME, e.g. with a GTP-C message.

In a twelfth step 712, the MME 12*a* forwards a load response to the eNB 11*a* e.g. by means of a S1AP message.

In the following FIG. 8, a further exemplary sequence of steps being performed by above-described network elements is illustrated:

In a first step (of this embodiment) 801, the eNB 11*a* and the MME 12*a* may measure or determine MN control plane load as discussed afore.

In a second step (of this embodiment) 802, the MME 12*a* sends a corresponding load report comprising UE contributions and corresponding UE identification information to the over the S_GW to the P-GW that are shown as combined gateway 12*bc* for simplification reasons.

In a third step (of this embodiment) 803, the gateway 12*bc* sends a policy request to the PCRF 12*d* based on the received load report.

Figure 8:
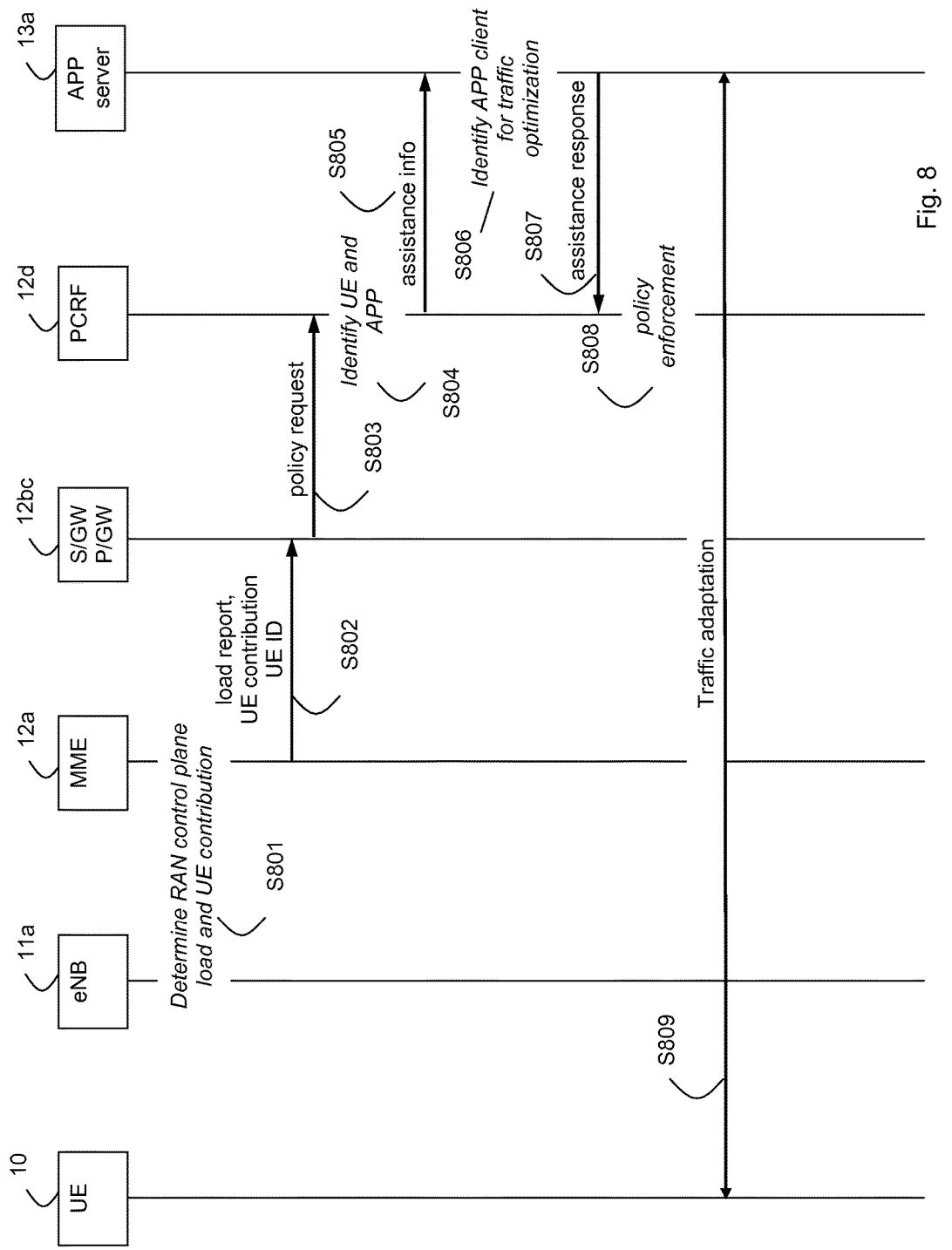
FIG. 8 shows a fifth exemplary sequence of steps illustrating a traffic adaptation between an application server and a UE based on control load information.

In a fourth step (of this embodiment) 804, based on the received load information, the PCRF 12*d* identifies an APP server, e.g. AP server 13*a* as exemplarily shown in FIG. 8, associated to a significant control load and/or to a significant ratio of control traffic versus payload traffic.

In a fifth step (of this embodiment) 805, in a case that a problematic UE and/or a problematic APP traffic has been detected, the PCRF 12*d* provides assistance information indicative of a mobile network control plane load status info and/or UE ID/IP to the corresponding APP server 13*a*, to enable the APP server to optimize its traffic.

In a sixth step (of this embodiment) 806, the APP server 13*a* may acknowledge to the PCRF 12*d* a receipt of the assistance information, and may further indicate, if APP traffic to one or a plurality of certain UEs can be optimized or not.

In a seventh step (of this embodiment) 807, based on such indication, the PCRF 12*d* may generate a policy and/or a policy update to be conveyed to the P-GW as discussed afore.

In an eight step (of this embodiment) 808, based on information provided from mobile network (e.g. further comprising application layer information), the APP server 13*a* initiates an APP traffic optimization mechanism to one or a plurality of APP clients (UEs) being identified by the UE identification information provided by mobile network.

In a ninth step (of this embodiment) 809, as an example, in case the control plane load is indicated as overloaded, to alleviate/reduce the control plane load, the APP server 13*a* may initiate a process with the APP client to reduce the traffic exchange frequency, e.g. adapting a "keep alive" message exchange frequency or adapting a news update frequency, and/or to bundle certain traffic into a burst. In case the control plane load is not indicated as overloaded or is indicated as light loaded (loaded below a certain load threshold), the APP server may initiate a process with the APP client to increase the traffic exchange frequency to improve user experience.

Embodiments of the invention allow an instance in the CN to quickly identify MN/RAN control plane congestion situations and initiate an effective traffic control in real time to mitigate such situations.

The CN may further identify problematic APPs, and/or problematic UEs and communicate with corresponding APP servers. The coordination with APP servers is especially valuable for OTT players to adapt an actual traffic scheme with subscribers to an actual mobile network load condition to disburden the mobile network.

The invention claimed is:

1. A method for controlling a control plane load in a mobile network the mobile network comprising a radio access network (RAN) adapted for connecting to a plurality of user equipments (UEs), and a core network (CN) comprising a policy server for determining communication traffic policy rules, wherein the policy server performs the following steps:
receiving a policy request indicative of a control plane load information identifying a control plane traffic associated with at least one of the plurality of UEs contributing to a control plane load of the RAN,
identifying user plane traffic associated with the control plane traffic,
determining a ratio of the control plane traffic to the user plane traffic, and
responsive to the ratio exceeding a threshold criterion, initiating a communication traffic management policy in the CN to enforce a reduction of the contribution of the at least one of the plurality of UE to the control plane load of the RAN, wherein initiating the communication traffic management policy in the CN comprises throttling or blocking the user plane traffic associated with the control plane traffic.

2. The method of claim 1, wherein initiating the traffic management policy in the CN comprises transmitting a policy response to a policy enforcement function of the CN indicative of a policy to reduce the RAN control plane load.

3. The method of claim 1, wherein the policy server retrieves subscriber information with respect to the identified at least one of the plurality of UEs, and wherein initiating the communication traffic policy comprises determining the communication traffic policy based on the control plane load of the RAN and the subscriber information.

4. The method of claim 1, further identifying the user plane traffic as resulting from the at least one of the plurality of UEs involved in communication traffic with an application server.

5. The method of claim 4, wherein the ratio comprises an overhead ratio and the user plane traffic comprises payload traffic.

6. The method of claim 4, wherein the policy server contacts the application server to initiate a change of an application traffic pattern towards the at least one of the plurality of UEs.

7. The method of claim 6, wherein the policy server contacts the application server to initiate a change of the application traffic pattern towards the at least one of the plurality of UEs.

8. A mobility management node of a core network (CN) adapted for providing a mobile management for user equipments (UEs) connected to a radio access network (RAN), comprising:
 a first interface adapted to receive from the RAN information indicative of a RAN control plane load,
 a processor adapted to:
  generate load information indicative of a ratio between a control plane load and a user plane load between an interface of the RAN and the CN,
  measure a signaling traffic load status associated with the control plane load between the interface of the RAN and the CN,
  determine a contribution of a UE of the UEs to the control plane load between the interface of the RAN and the CN based on a measurement of the signaling traffic load status associated with user plane traffic of the UE, and
 a second interface adapted to transmit a load report message comprising the RAN control plane load and the generated load information towards the policy server to be used by the policy server of the CN to initiate traffic management of the RAN, wherein the load report comprises information identifying the contribution of the UE to the control plane load between the interface of the RAN and the CN.

9. A policy server adapted to determine communication traffic policy rules within a mobile network comprising a radio access network (RAN) adapted for connecting to a plurality of user equipments (UEs), and a core network, the policy server comprising:
 an interface adapted to:
  receive load information identifying a control plane traffic associated with at least one of the plurality of UEs contributing to a control plane load of the RAN, and
  to transmit a policy response to be enforced by the CN to reduce the contribution of the at least one of the plurality of UEs to the control plane load of the RAN, and a processor adapted to:
  identify user plane traffic associated with the control plane traffic,
  determine a ratio of the control plane traffic to the user plane traffic, and
  generate the policy response based on the RAN control plane load responsive to the ratio exceeding a threshold criterion, wherein the policy response comprises throttling or blocking the user plane traffic associated with the control plane traffic.

10. The policy server of claim 9, comprising a further interface adapted for transmitting an assistance message to an application server involved in application traffic towards the at least one of the plurality of user equipments (UEs) connected to the RAN, wherein the assistance message is based on the load information.

11. The policy server of claim 10, wherein the assistance message is indicative of a request to change a traffic pattern between the at least one of the plurality of UEs, and the application server.

\* \* \* \* \*